United States Patent
Raybould et al.

(10) Patent No.: US 9,139,480 B2
(45) Date of Patent: Sep. 22, 2015

(54) PROTECTIVE COATINGS AND COATED COMPONENTS COMPRISING THE PROTECTIVE COATINGS

(75) Inventors: Derek Raybould, Denville, NJ (US);
Paul Chipko, Blairstown, NJ (US);
Bradley Reed Tucker, Chandler, AZ (US)

(73) Assignee: HONEYWELL INTERNATIONAL INC., Morristown, NJ (US)

(*) Notice: Subject to any disclaimer, the term of this patent is extended or adjusted under 35 U.S.C. 154(b) by 348 days.

(21) Appl. No.: 13/036,803

(22) Filed: Feb. 28, 2011

(65) Prior Publication Data
US 2012/0219808 A1    Aug. 30, 2012

(51) Int. Cl.
| B32B 9/04 | (2006.01) |
| B32B 9/06 | (2006.01) |
| B32B 15/04 | (2006.01) |
| B32B 9/00 | (2006.01) |
| B32B 19/00 | (2006.01) |
| C04B 41/89 | (2006.01) |
| C04B 41/00 | (2006.01) |
| C04B 41/52 | (2006.01) |
| F01D 5/28 | (2006.01) |
| C23C 28/04 | (2006.01) |

(52) U.S. Cl.
CPC .............. *C04B 41/89* (2013.01); *C04B 41/009* (2013.01); *C04B 41/52* (2013.01); *C23C 28/042* (2013.01); *F01D 5/288* (2013.01); *F05D 2230/90* (2013.01); *F05D 2300/222* (2013.01); *Y02T 50/67* (2013.01); *Y02T 50/672* (2013.01)

(58) Field of Classification Search
CPC ...... C04B 41/009; C04B 41/52; C04B 41/89; C04B 41/5024; C04B 41/5042; C04B 41/5027; C23C 28/042
USPC .................. 428/446, 448, 450, 472, 701, 702
See application file for complete search history.

(56) References Cited

U.S. PATENT DOCUMENTS

| 3,789,096 | A | * | 1/1974 | Church et al. ................. 264/122 |
| 4,996,117 | A | * | 2/1991 | Chu et al. ........................ 428/633 |
| 5,209,645 | A | | 5/1993 | Kojima et al. |
| 5,683,825 | A | | 11/1997 | Bruce et al. |
| 5,934,206 | A | | 8/1999 | Saxon et al. |
| 5,985,470 | A | | 11/1999 | Spitsberg et al. |
| 6,241,469 | B1 | | 6/2001 | Beeck et al. |
| 6,355,356 | B1 | | 3/2002 | Hasz |
| 6,413,589 | B1 | | 7/2002 | Li |
| 6,428,280 | B1 | | 8/2002 | Austin et al. |

(Continued)

FOREIGN PATENT DOCUMENTS

WO    2008030674 A1    3/2008

OTHER PUBLICATIONS

EP Examination Report for 11 194 392.4, dated Jun. 14, 2012.
(Continued)

*Primary Examiner* — Jonathan Langman
(74) *Attorney, Agent, or Firm* — Ingrassia Fisher & Lorenz, P.C.

(57) ABSTRACT

A coated component is provided comprising a silicon-based substrate and a braze layer overlying the silicon-based substrate. The braze layer comprises silicon, tantalum, and a metal element having substantially the same melt temperature with silicon as tantalum has with silicon. The braze layer further comprises ceramic particles. Protective coatings are also provided.

19 Claims, 4 Drawing Sheets

(56) References Cited

U.S. PATENT DOCUMENTS

| | | |
|---|---|---|
| 6,517,960 B1 * | 2/2003 | Wang .......................... 428/701 |
| 6,682,821 B2 | 1/2004 | Fukudome et al. |
| 6,759,151 B1 | 7/2004 | Lee |
| 6,777,093 B1 * | 8/2004 | Ojard et al. ................... 428/448 |
| 7,115,319 B2 | 10/2006 | Raybould et al. |
| 7,323,247 B2 | 1/2008 | Raybould et al. |
| 7,374,825 B2 | 5/2008 | Hazel et al. |
| 7,579,085 B2 | 8/2009 | Hazel |
| 7,595,114 B2 | 9/2009 | Meschter et al. |
| 7,740,960 B1 | 6/2010 | Zhu et al. |
| 2005/0079343 A1 | 4/2005 | Raybould et al. |
| 2005/0142393 A1 * | 6/2005 | Boutwell et al. ............. 428/701 |
| 2006/0280952 A1 | 12/2006 | Hazel et al. |
| 2006/0280963 A1 * | 12/2006 | Hazel et al. .................. 428/689 |
| 2007/0128447 A1 * | 6/2007 | Hazel et al. .................. 428/426 |
| 2008/0142575 A1 | 6/2008 | Cretegny |
| 2009/0017260 A1 * | 1/2009 | Kulkarni et al. ............. 428/161 |
| 2009/0092826 A1 | 4/2009 | Carlin et al. |
| 2009/0148278 A1 * | 6/2009 | Allen ........................ 415/173.4 |
| 2009/0159645 A1 | 6/2009 | Cretegny et al. |
| 2009/0297866 A1 | 12/2009 | Raybould et al. |
| 2010/0129636 A1 * | 5/2010 | Cybulsky et al. .......... 428/310.5 |

OTHER PUBLICATIONS

EP Search Report for 11 194 392.4, dated May 22, 2012.
EP Communication, EP 11194392.4-1362 dated Jun. 19, 2013.

* cited by examiner

PROTECTIVE COATINGS AND COATED COMPONENTS COMPRISING THE PROTECTIVE COATINGS

STATEMENT REGARDING FEDERALLY SPONSORED RESEARCH OR DEVELOPMENT

This invention was made with Government support under W911W6-08-2-0001 awarded by U.S. Army. The Government has certain rights in this invention.

TECHNICAL FIELD

The present invention generally relates to protective coatings for turbine engine components that operate under severe operating conditions, and more particularly relates to protective coatings and coated components comprising the protective coatings.

BACKGROUND

Turbine engines are used as the primary power source for various kinds of aircraft. Silicon-based substrates, such as silicon nitride and silicon carbide composites, are used for making turbine engine components that may be exposed to severe operating conditions. As used herein, "severe operating conditions" include high gas velocities (greater than about 500 m/second, exposure to salt, sulfur, and sand, and high temperatures of up to about 1500° C.). Although silicon-based substrates have good high temperature properties and many other advantages, they may be susceptible to recession under the severe operating conditions of an operating turbine engine. For example, water vapor may form inside the engine from gases in the atmosphere. The water vapor, when mixed with silicon from the component material, forms silicon hydroxide that can result in recession of silicon from the component, reducing component service life and necessitating its replacement or repair. Hot corrosion and erosion of the component from the salt, sulfur, and sand are also problems for substantially all substrates under severe operating conditions.

The resistance to recession of such silicon-based components, and the resistance to hot corrosion and erosion of silicon-based and non-silicon-based components, can be enhanced by applying protective coatings over the component. Conventional protective coatings include an environmental barrier coating (EBC), a thermal barrier coating (TBC), a braze layer, and combinations thereof. A "multi-layer protective coating" may be formed from the combination of coatings and/or layers. In a conventional multi-layer protective coating for a silicon-based component, the braze layer may be disposed between the silicon-based substrate or component and the environmental barrier coating (EBC), and the thermal barrier coating (TBC) may be disposed on the EBC. The braze layer substantially prevents diffusion of silicon nitride or silicon carbide from the silicon-based substrate or component into the EBC. Conventional braze layers contain silicon, tantalum, and chromium. The inclusion of tantalum and chromium reduces the melting point of the braze layer below that of a silicon braze layer and helps form additional intermetallic compounds that strengthen the braze layer and make it more resistant to oxidation and recession. However, such intermetallic compounds have different melting points making the coating operation difficult, especially for large scale components. For example, a chromium silicon braze has a melting point of 1305° C. and a tantalum silicon braze has a melting point of 1410° C.

The thermal barrier coating is typically a ceramic material such as zirconia or hafnia, and is stabilized with an oxide such as yttria to form yttria-stabilized zirconia or hafnia. The thermal barrier coating (TBC) effectively insulates the component from heat, reducing the temperature of the component and extending its service life. The TBC is itself susceptible to degradation by various processes that occur during operation of the turbine engine. One such degradation process that may occur is the formation of calcium-magnesium-aluminosilicate (CMAS) from engine dirt or other particles in the turbine engine. Under severe operating conditions, built-up CMAS on engine components may melt and penetrate pores in the TBC. As the built-up CMAS solidifies, the CMAS may cause stresses within the TBC, degrading the TBC and causing increased temperature and wear of the turbine engine components. Additionally, other chemical processes may occur as an indirect result of CMAS build-up, further degrading the TBC and damaging engine components.

In addition, mismatched coefficients of thermal expansions (CTE) between the substrate and overlying layer(s) of the protective coating induce stress in the coating. A silicon-based substrate typically has a low thermal expansion compared to overlying layer(s). To help compensate for the high CTE of the thermal barrier coating, for example, and reduce the CTE mismatch, porosity has been introduced into conventional TBCs by plastic spheres (typically polystyrene) that form pores when burned off at elevated temperatures. The increase in porosity decreases the CTE of the TBC to be closer to the CTE of the underlying layer(s). However, at severe operating conditions, at least a portion of the TBC may sinter, closing the pores. The reduction in porosity results in an increase in the CTE of the TBC, hereinafter referred to as a "sintering effect." The sintering effect can result in stress-induced fractures of the coating.

Accordingly, it is desirable to provide a protective coating and a coated component comprising the protective coating. In addition, it is desirable to provide a protective coating with improved resistance to at least one of recession, corrosion, erosion, CMAS at severe operating conditions. It is also desirable to provide a protective coating that simplifies the coating operation, and reduces thermal expansion mismatches between the substrate and overlying layer(s) of the protective coating. Furthermore, other desirable features and characteristics of the present invention will become apparent from the subsequent detailed description of the invention and the appended claims, taken in conjunction with the accompanying drawings and this background of the invention.

BRIEF SUMMARY

A coated component is provided. In accordance with one exemplary embodiment, the coated component comprises a silicon-based substrate and a protective coating comprising a braze layer overlying the silicon-based substrate. The braze layer comprises silicon, tantalum, and a metal element having substantially the same melt temperature with silicon as tantalum has with silicon; and ceramic particles.

A protective coating for a silicon-based substrate is provided in accordance with yet another exemplary embodiment. The protective coating comprises a braze layer. The braze layer comprises silicon, tantalum, and a metal element having substantially the same melt temperature with silicon as tantalum has with silicon, and ceramic particles.

A protective coating is provided in accordance with yet another exemplary embodiment. The protective coating comprises a thermal barrier coating comprising a ceramic material selected from the group consisting of zircon, yttria-stabilized zirconia and yttria-stabilized hafnia; and metal particles, a metal oxide, a metal silicate, a metal disilicate, or a combination of two or more of the metal oxide, the metal silicate, and the metal disilicate.

A braze mixture is provided in accordance with yet another exemplary embodiment. The braze mixture comprises silicon, tantalum, and a metal element having substantially the same melt temperature with silicon as tantalum has with silicon.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments of the present invention are directed to protective coatings and coated components comprising the protective coatings. In accordance with an exemplary embodiment, the coated component comprises a substrate and a protective coating overlying the substrate. The substrate may be a silicon-based substrate. In an embodiment, the protective coating comprises a braze layer. The braze layer has improved oxidation resistance, reduces the mismatch of coefficient of thermal expansion (CTE) between the substrate and the braze layer, and simplifies the coating operation. The protective coating may further comprise an environmental barrier coating (EBC) overlying the braze layer and a thermal barrier coating (TBC) overlying the environmental barrier coating. In an embodiment, the thermal barrier coating may be used without the braze layer and/or the EBC. The TBC is porous to further reduce CTE mismatches. The protective coating may further comprise a transition layer between the EBC and TBC to provide a gradual progression of CTE toward the TBC to reduce stress caused by CTE mismatches. The protective coating substantially protects the coated component in severe operating conditions against oxidation, recession, corrosion, erosion, CMAS, or a combination thereof. As noted previously, "severe operating conditions" include high gas velocities (greater than 500 m/sec), exposure to salt, sulfur, and sand, and high temperatures of up to about 1500° C.

Figure 1:
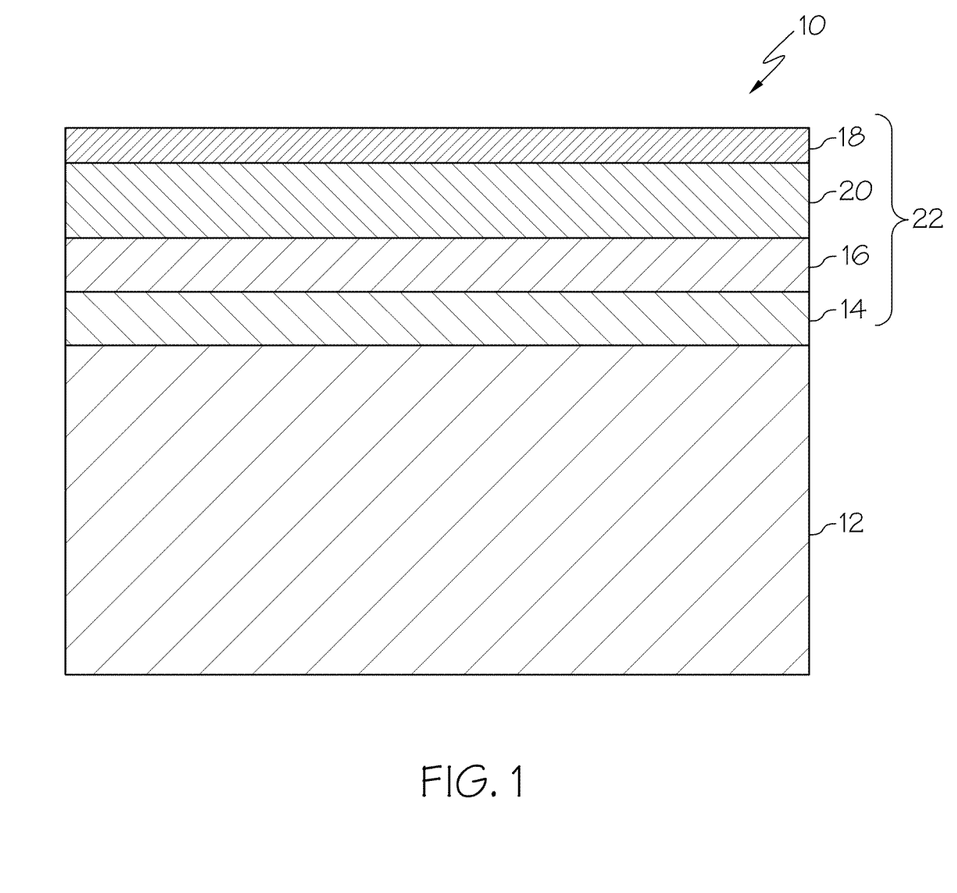
FIG. 1 is a cross-sectional view illustrating a portion of a coated component, according to an exemplary embodiment of the present invention.

Referring to FIG. 1, in an embodiment, the coated component 10 comprises a substrate 12, such as a silicon-based substrate, and a protective coating 22 overlying the substrate.

The component may be, for example, a gas turbine engine component, e.g., a nozzle, turbine wheel, turbine shroud, combustor, or a blade configured from the silicon-based substrate. The silicon-based substrate comprises a silicon nitride-, or a silicon carbide-based ceramic or composite. Such silicon-based materials can withstand operating temperatures of up to about 1500° C., with a protective coating.

In an embodiment, the protective coating 22 comprises a braze layer 14 and one or more of an environmental barrier coating (EBC) 16, a thermal barrier coating (TBC) 18, and a transition layer 20. The braze layer 14 is formed from a braze mixture applied to a surface of the silicon-based substrate forming a braze-based protective coating. The thickness of the braze layer 14 is in the range of about 5 to about 100 nm. The braze mixture comprises a eutectic alloy powder of silicon (Si), tantalum (Ta), and a metal element having substantially the same melt temperature with silicon as tantalum has with silicon (about 1400° C.). As used herein, "substantially the same" means within about 2.5% of 1400° C. The metal element may be zirconium (Zr), niobium, (V), molybdenum (Mo), tungsten (W), rhenium (Re), carbon (C), boron (B), and combinations thereof. Intermetallic compounds may be formed in the braze layer 14 by the reaction of silicon with one or more of the other elements in the braze mixture. Each intermetallic may be present in a volume % of about 10 to about 70%. The amount of silicon, tantalum, and the metal element added to the braze mixture may be calculated depending on the desired volume % of intermetallic, as known to one skilled in the art.

The braze layer 14 further comprises up to about 20 vol % ceramic particles. The ceramic particles may be dispersed in the braze mixture, distributed on a surface of the silicon-based substrate 12 prior to applying the braze mixture, distributed after application of the braze mixture, or a combination thereof. The ceramic particles may be oxide particles such as, for example, $Zr_2O_3$, or particles of a metal silicate or disilicate such as $ZrSiO_4$, scandium disilicate ($Sc_2Si_2O_7$), or the like, and combinations thereof. The size of the ceramic particles ranges from about 20 to about 100 μm. The ceramic particles lower the CTE of the braze layer 14 to be closer to the CTE of the silicon-based substrate, thereby reducing the CTE mismatch between the braze layer and the substrate. The ceramic particles also improve the water vapor and oxidation resistance of the braze layer. For example, $Zr_2O_3$ forms $ZrSiO_4$ with the $SiO_2$ scale formed on the surface of the braze layer during brazing and also during use, while the metal silicate can form a disilicate with the $SiO_2$, thereby providing an oxidation barrier. In addition, if the concentration of scandium disilicate particles toward the surface of the braze layer 14 is increased, and the EBC layer 16 comprises scandium disilicate, the bond between the braze layer 14 and the EBC layer 16 is improved and the bend strength of the coated component 10 is increased. The braze layer 14 is applied to the silicon-based substrate by conventional processes such as, for example, applying a paste containing the braze mixture to the silicon-based substrate and then heating to the melt temperature of about 1400° C.

The protective coating 22 may further comprise the environmental barrier coating (EBC) 16 overlying the braze layer. The environmental barrier coating 16 comprises an EBC material. Suitable exemplary EBC materials for silicon-based substrates include, for example, $Ta_2O_5$, a metal silicate, a disilicate, for example, scandium disilicate, $YbSiO_3$, and the like, or combinations thereof. The metal silicate and disilicate may include one or more metals. Suitable multi-metal silicates and disilicates include, for example, $YbScSiO_3$, $ZrScO_3$, $YYbSiO_3$, or combinations thereof. Silicides and disilicides of hafnium (Hf), scandium (Sc), strontium (Sr), Yttrium (Y), Ytterbium (Yb), and the Lanthanide series of elements are suitable exemplary EBC materials. Preferably, the EBC material may be a metal disilicate comprising about 0.5 to about 10 wt % monosilicate and about 0.5 to about 5 wt % oxide, the balance being the disilicate. The environmental barrier coating has a coefficient of thermal expansion (CTE) in the range of from about 2 to $6 \times 10^{-6\circ}$ C.$^{-1}$, and preferably about 3 to $5 \times 10^{-6\circ}$ C.$^{-1}$. The environmental barrier coating may have a thickness in the range of about 50 to about 250 μm.

The protective coating 22 may further comprise the thermal barrier coating (TBC) 18 overlying the environmental barrier coating 16. As is known in the art, the thermal barrier coating 18 comprises a ceramic material such as zirconia, zircon, or hafnia, and may be stabilized with an oxide such as yttria to form, for example, yttria-stabilized zirconia or yttria-stabilized hafnia. The thermal barrier coating may further comprise plastic particles such as spheres and the like. As previously noted, the plastic spheres introduce porosity into the TBC when burned off at elevated temperatures, but at least a portion of the resultant pores are closed by sintering under severe operating conditions.

In accordance with an exemplary embodiment, metal particles may alternatively (with the plastic spheres) or additionally be added to the thermal barrier coating to increase the porosity of the TBC. The metal particles are added to compensate for the sintering effect and differences in CTE between the substrate and the protective coating. The metal particles are formed of a metal such as copper (Cu), tantalum (Ta), chromium (Cr), tungsten (W), molybdenum (Mo), and combinations thereof. The metal particles may be, for example, spherical, but other shapes may be used. The metal particles may be mixed with the ceramic material and the mixture applied overlying the EBC 16 or transition layer 20, as hereinafter described. The size of the metal particles ranges from about 20 to about 160 μm. The TBC has a thickness in the range of about 10 to about 400 μm. The mixture of the ceramic material and metal particles may be applied, for example, by plasma spraying or the like forming volatile metal oxides in the thermal barrier coating. Either during operation (flight) or during heat treatment, the volatile metal oxide particles in the TBC vaporize forming a porous TBC with a reduced coefficient of thermal expansion (CTE) relative to its CTE prior to operation or heat treatment.

In accordance with an alternative embodiment, the TBC 18 comprises a ceramic material and a metal oxide, a metal silicate, a metal disilicate, or combinations of at least two of the metal oxide, the metal silicate, and the metal disilicate. Such combinations may include a combination of a metal oxide with a metal silicate or a metal disilicate or a combination of the metal silicate with the metal disilicate. The thermal barrier coating 18 may further comprise the plastic particles. Suitable exemplary metal oxides include, for example, Yttrium oxide ($Y_2O_3$), Ytterbium oxide ($Yb_2O_3$), Scandium dioxide ($Sc_2O_3$), and combinations thereof. Suitable exemplary metal silicates include, for example, $YSiO_3$, $YbSiO_3$, and $ScSiO_3$. The TBC comprises about 25 vol % of the metal oxide, the metal silicate or disilicate, or combinations of at least two of the metal oxide, the metal silicate, and the metal disilicate. The concentration of metal oxides and/or metal silicates or disilicates may be increased toward the surface of the thermal barrier coating. The presence of the metal oxide and/or silicate and/or disilicate in the TBC reduces CTE mismatch between the TBC and underlying layer(s), and also reduces the effects of calcium-magnesium-aluminosilicate (CMAS) by forming stable silicides (with the metal silicates) or disilicides (with the metal disilicates). The stable silicides help reduce penetration of CMAS into the TBC. While a TBC has been described as overlying a silicon-based substrate, a braze layer, an EBC, and a transition layer as hereinafter described, it is to be understood that such a TBC may be used overlying a non-silicon-based substrate, without the braze layer, EBC, transition layer, or a combination thereof, to reduce CTE mismatch and reduce the effects of CMAS, in accordance with an exemplary embodiment.

The protective coating 22 may further comprise the transition layer 20 between the environmental barrier coating 16 and the thermal barrier coating 18. It is to be understood that while the transition layer is shown as a single layer for ease of illustration, the transition layer may be multiple layers. The transition layer comprises a ceramic material and a material having a coefficient of thermal expansion (CTE) substantially the same (within about 15%) as the CTE of the EBC material. The ceramic material used in the transition layer and the TBC can be the same or the ceramic material in the transition layer may be different from the ceramic material used in the TBC. When the ceramic material in the transition layer is different from the ceramic material used in the TBC, the ceramic material in the transition layer may be zircon, ytrria-stablized zirconia, or yttria-stabilized hafnia. As an example, the ceramic material in both the transition layer and the TBC may be, for example, yttria-stabilized zirconia or the ceramic material in the transition layer may be yttria-stabilized zirconia while the ceramic material in the TBC may be zircon. The transition layer comprises about 10 to about 50 vol % of the material having a CTE substantially the same as the CTE of the EBC material, with the composition of the transition layer changing gradually, with an increasing concentration of the ceramic material in the direction of the thermal barrier coating. Exemplary materials that may be used with the ceramic material in the transition layer include $Ta_2O_5$, and silicates or disilicates such as $Sc_2Si_2O_7$, and combinations thereof. This gradual progression of the CTE in the transition layer in the direction of the thermal barrier coating substantially eliminates the thermal expansion mismatch between the EBC and TBC.

EXAMPLES

The following examples were prepared according to the steps described above. The examples are provided for illustration purposes only, and are not meant to limit the various embodiments of the present invention in any way. The protective coatings produced in accordance with these examples were analyzed by scanning electron micrography (SEM).

Example 1

Figure 2:
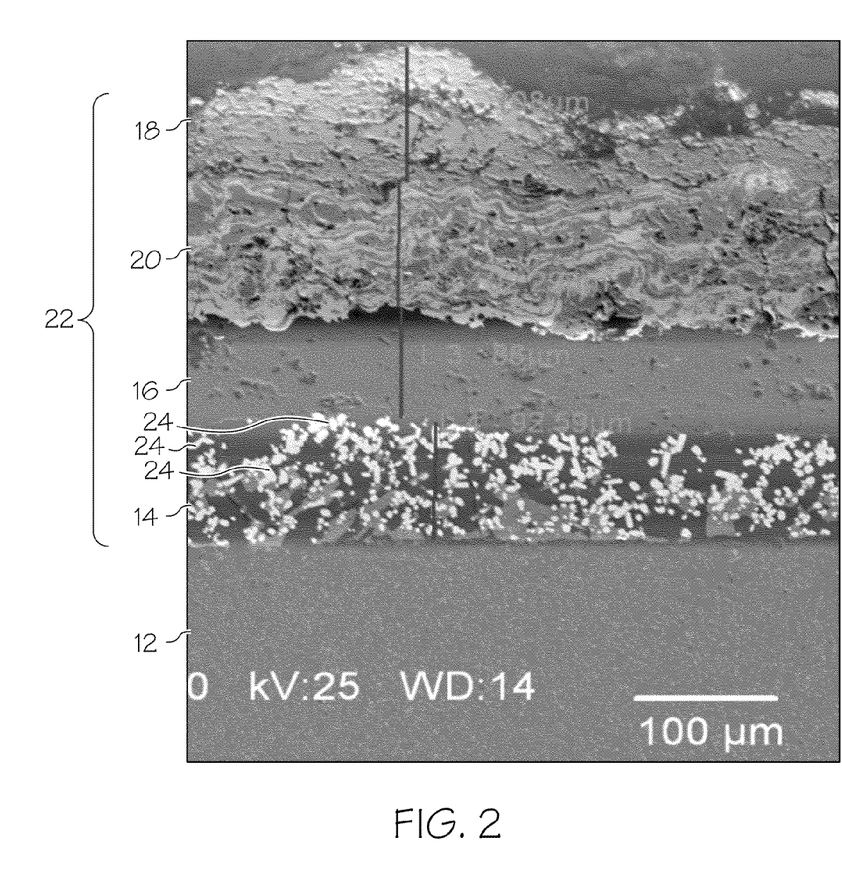
FIGS. 2-4 are SEM micrographs of an exemplary protective coating on an exemplary substrate, according to an exemplary embodiment of the present invention.

A protective coating 22 overlying a silicon-based substrate 12 is shown in the SEM micrograph of FIG. 2. The protective coating 22 in accordance with an exemplary embodiment comprises the braze layer 14 including a high volume of intermetallic compounds 24, the EBC 16, the transition layer 20, and the TBC 18. The substrate 12 is a silicon nitride-based substrate. The braze layer 14 is silicon, 35 wt % Ta and 10 wt % Cr applied as a paste to the part and brazed at about 1400° C. following standard techniques. The white particles in the braze layer are the TaSi intermetallic, gray particles are the CrSi intermetallic. The dark areas are silicon-rich. The EBC 16 is scandium disilicate. The transition layer 20 is yittria-stabilized zirconia plus tantalum oxide (white areas). The thermal barrier coating 18 is yittria-stabilized zirconia. The TBC, transition layer and EBC are applied by standard plasma spray techniques.

Example 2

Figure 3:
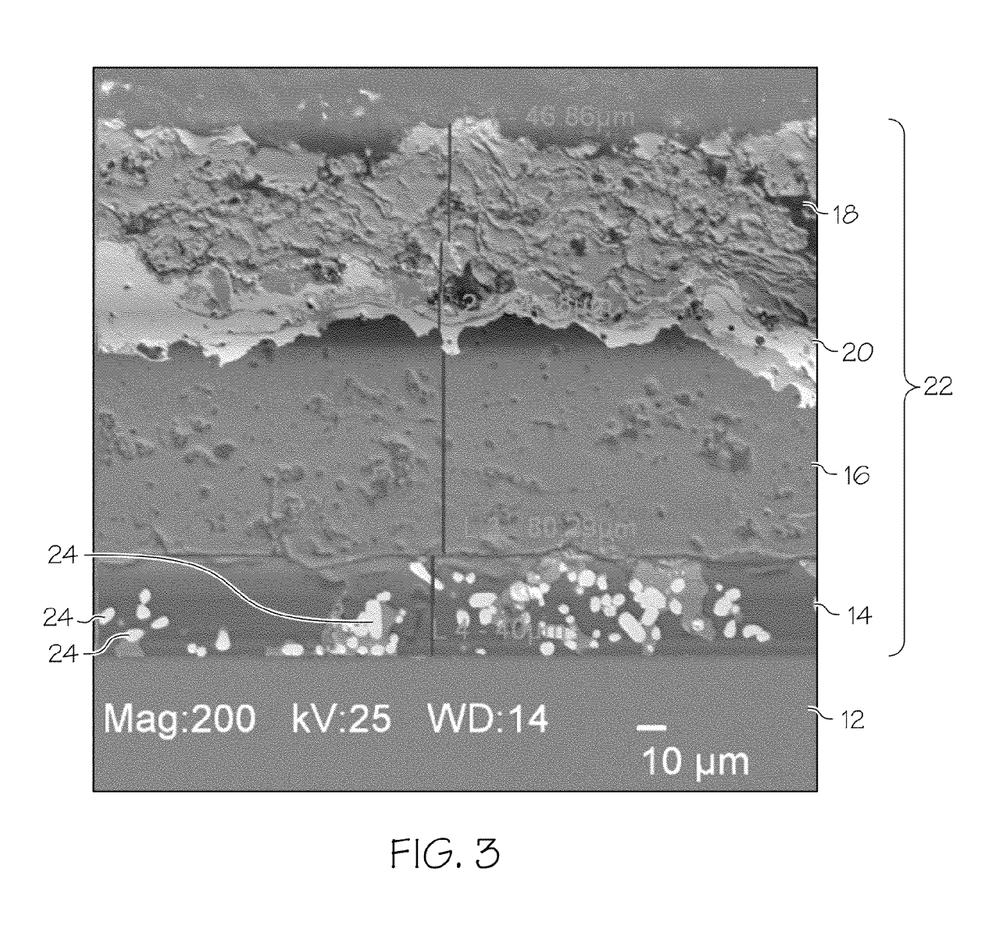

An exemplary protective coating 22 overlying a silicon-based substrate 12 is shown in the SEM micrograph of FIG. 3. The protective coating 22 in accordance with an exemplary embodiment comprises the braze layer 14 including a high volume of intermetallic compounds 24, the EBC 16, the transition layer 20, and the TBC 18. In FIG. 3, the substrate is a silicon nitride-based substrate. The braze layer is silicon, 20 wt % Ta and 5 wt % Cr applied as a paste to the part and brazed at about 1400° C. following standard techniques. The white particles in the braze are the TaSi intermetallic, and the gray particles are the CrSi intermetallic. The dark areas are silicon rich. The EBC is scandium disilicate. The transition layer is yittria-stabilized zirconia and tantalum oxide (white areas). The TBC is yittria-stabilized zirconia. The EBC, transition layer, and TBC were applied by standard plasma spray techniques.

Example 3

Figure 4:
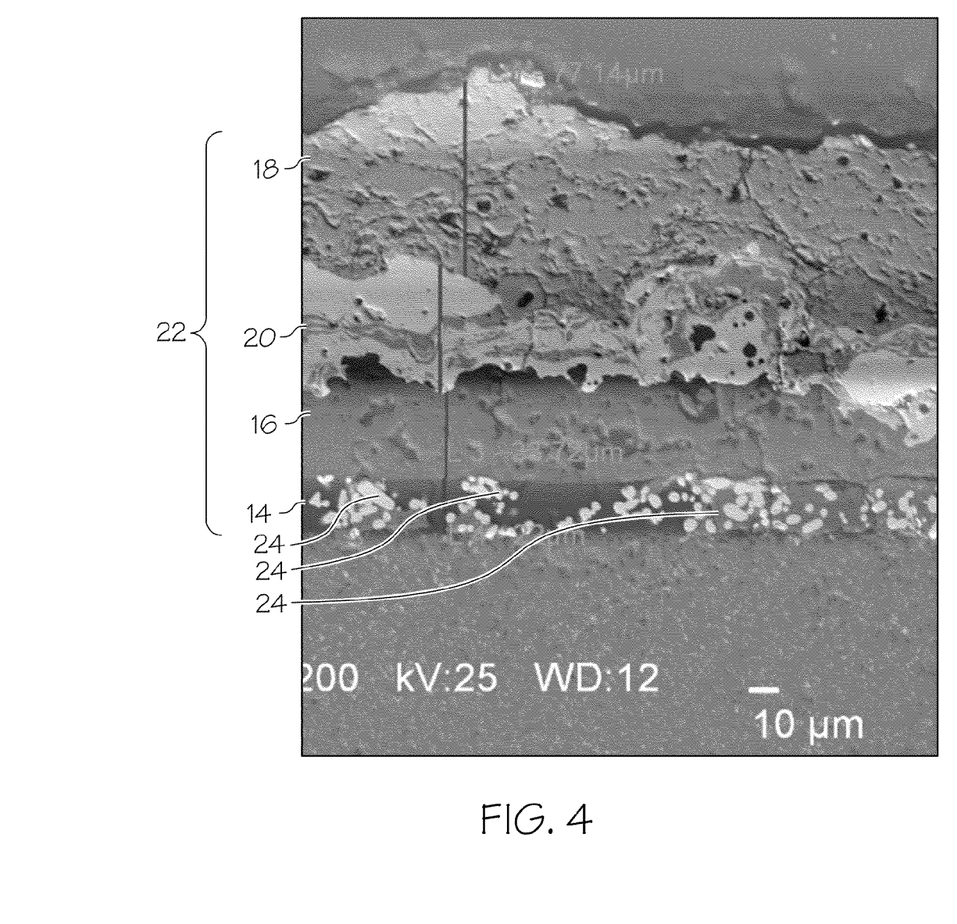

An exemplary protective coating 22 overlying a silicon-based substrate 12 is shown in the SEM micrograph of FIG. 4. The protective coating 22 in accordance with an exemplary embodiment comprises the braze layer 14 including a high volume of intermetallic compounds 24, the EBC 16, the transition layer 20, and the TBC 18. In FIG. 3, the substrate is silicon nitride-based. The braze layer is silicon, 25 wt % Ta and 5 wt % Cr applied as a paste to the part and brazed at about 1400° C. following standard techniques. The white particles in the braze are the TaSi intermetallic, and the gray particles are the CrSi intermetallic. The dark areas are silicon rich. The EBC is scandium disilicate. The transition layer is yittria-stabilized zirconia and tantalum oxide (white areas). The TBC is yittria-stabilized zirconia. The EBC, transition layer, and TBC were applied by standard plasma spray techniques.

From the foregoing, it is to be appreciated that the protective coatings and coated components comprising the protective coatings in accordance with exemplary embodiments as described herein provide improved resistance of the component to at least one of oxidation, recession, corrosion, erosion, and CMAS at severe operating conditions. The protective coating also simplifies the coating operation, and reduces thermal expansion mismatches between the substrate and overlying coating(s)/layer(s) of the protective coating.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A coated component, comprising:
   a silicon-based substrate;
   a protective coating comprising a braze layer overlying the silicon-based substrate, the braze layer consisting essentially of:
      intermetallic compounds of silicon and tantalum and silicon and a metal element in an eutectic alloy of silicon, tantalum, and the metal element, the metal element having substantially the same eutectic melt temperature with silicon as tantalum has with silicon; and
      ceramic particles comprising $Zr_2O_3$, metal silicate particles excluding aluminum silicate, metal disilicate particles, or combinations thereof.

2. The coated component of claim 1, wherein the metal element comprises zirconium, niobium, vanadium, molybdenum, tungsten, rhenium, carbon, boron, or combinations thereof.

3. The coated component of claim 1, wherein the protective coating further comprises an environmental barrier coating (EBC) overlying the braze layer, the environmental barrier coating comprised of an EBC material.

4. The coated component of claim 3, wherein the protective coating further comprises a porous thermal barrier coating overlying the environmental barrier coating, wherein the porous thermal barrier coating comprises:
   a ceramic material selected from the group consisting of zircon, yttria-stabilized zirconia, and yttria-stabilized hafnia;
   a plurality of pores formed from vaporized metal oxide particles comprising a metal selected from the group consisting of copper, tantalum, chromium, tungsten, molybdenum, and combinations thereof.

5. The coated component of claim 4, wherein the protective coating further comprises a transition layer between the environmental barrier coating and the thermal barrier coating, the transition layer comprising the ceramic material and a material having a coefficient of thermal expansion substantially the same as the coefficient of thermal expansion of the EBC material, with the composition of the transition layer changing gradually, with an increasing concentration of ceramic material in the direction of the thermal barrier coating.

6. The coated component of claim 3, wherein the protective coating further comprises a porous thermal barrier coating overlying the environmental barrier coating, wherein the porous thermal barrier coating comprises:
   a ceramic material selected from the group consisting of zircon, yttria-stabilized zirconia, and yttria-stabilized hafnia;
   a metal oxide, a metal silicate, a metal disilicate, or combinations thereof, wherein the metal oxide is selected from the group consisting of Yttrium oxide($Y_2O_3$), Ytterbium oxide ($Yb_2O_3$), Scandium dioxide ($Sc_2O_3$), and combinations thereof; and
   a plurality of pores.

7. The coated component of claim 6, wherein the protective coating further comprises a transition layer between the environmental barrier coating and the thermal barrier coating, the transition layer comprising the ceramic material and a material having a coefficient of thermal expansion substantially the same as the coefficient of thermal expansion of the EBC material, with the composition of the transition layer changing gradually, with an increasing concentration of ceramic material in the direction of the thermal barrier coating.

8. The coated component of claim 1, wherein the metal silicate particles comprise $ZrSiO_4$ and the metal disilicate particles comprise $Sc_2Si_2O_7$.

9. A protective coating for a silicon-based substrate, comprising:
   a braze layer comprising:
      intermetallic compounds of silicon and tantalum and silicon and a metal element in an eutectic alloy of silicon, tantalum, and the metal element, the metal element having substantially the same eutectic melt temperature with silicon as tantalum has with silicon; and ceramic particles comprising $Zr_2O_3$, metal silicate particles, metal disilicate particles, or combinations thereof, wherein the ceramic particles are present in an amount of up to about 20 vol % of the braze layer.

10. The protective coating of claim 9, wherein the metal element comprises zirconium, niobium, vanadium, molybdenum, tungsten, rhenium, carbon, boron, or combinations thereof.

11. The protective coating of claim 9, further comprising an environmental barrier coating (EBC) disposed on the braze layer, the environmental barrier coating comprised of an EBC material selected from the group consisting of $Ta_2O_5$, a metal silicate, a metal disilicate, and a combination of the metal silicate and the metal disilicate, a metal of the metal silicate and the metal disilicate selected from the group consisting of hafnium (Hf), scandium (Sc), strontium (Sr), yttrium (Y), ytterbium (Yb), and the Lanthanide series of elements, and combinations thereof, wherein the metal disilicate comprises about 0.5 to about 10 wt % monosilicate and about 0.5 to about 5 wt % oxide.

12. The protective coating of claim 11, further comprising a porous thermal barrier coating overlying the environmental barrier coating, the porous thermal barrier coating comprising:
 a ceramic material selected from the group consisting of zircon, yttria-stabilized zirconia, and yttria-stabilized hafnia;
 a plurality of pores; and
 a metal oxide, a metal silicate, a metal disilicate, or combinations thereof.

13. The protective coating of claim 12, wherein the metal oxide is selected from the group consisting of Yttrium oxide ($Y_2O_3$), Ytterbium oxide ($Yb_2O_3$), Scandium dioxide ($Sc_2O_3$), and combinations thereof.

14. The protective coating of claim 12, further comprising a transition layer between the environmental barrier coating and the thermal barrier coating, the transition layer comprising the ceramic material and a material having a coefficient of thermal expansion substantially the same as the coefficient of thermal expansion of the EBC material, with the composition of the transition layer changing gradually, with an increasing concentration of ceramic material in the direction of the thermal barrier coating.

15. The protective coating of claim 11, further comprising a porous thermal barrier coating overlying the environmental barrier coating, the porous thermal barrier coating comprising:
 a ceramic material selected from the group consisting of zircon, yttria-stabilized zirconia, and yttria-stabilized hafnia; and
 a plurality of pores formed from vaporized metal oxide particles comprising a metal selected from the group consisting of copper, tantalum, chromium, tungsten, molybdenum, and combinations thereof.

16. A protective coating for a silicon-based substrate, the protective coating comprising:
 a porous thermal barrier coating that overlies the silicon-based substrate, the porous thermal barrier coating comprising:
  a ceramic material consisting of zircon;
  a plurality of pores formed from vaporized metal oxide particles comprising a metal selected from the group consisting of copper, tantalum, chromium, tungsten, molybdenum, and combinations thereof;
 a braze layer comprising:
  silicon, tantalum, and a metal element having substantially the same eutectic melt temperature with silicon as tantalum has with silicon; and
  ceramic particles,
 wherein an environmental barrier coating is disposed between the braze layer and the thermal barrier coating, the environmental barrier coating comprised of an EBC material selected from the group consisting of $Ta_2O_5$, a metal silicate, a metal disilicate, and a combination of the metal silicate and the metal disilicate, a metal of the metal silicate and the metal disilicate selected from the group consisting of hafnium (Hf), scandium (Sc), strontium (Sr), yttrium (Y), ytterbium (Yb), and the Lanthanide series of elements, and combinations thereof, wherein the metal disilicate comprises about 0.5 to about 10 wt % monosilicate and about 0.5 to about 5 wt % oxide.

17. The protective coating of claim 16, wherein the metal element comprises zirconium, niobium, vanadium, molybdenum, tungsten, rhenium, carbon, boron, or combinations thereof.

18. The protective coating of claim 16, wherein a transition layer is disposed between the environmental barrier coating and the thermal barrier coating, wherein the transition layer comprises the ceramic material and a material having a coefficient of thermal expansion substantially the same as the coefficient of thermal expansion of the EBC material, with the composition of the transition layer changing gradually, with an increasing concentration of ceramic material in the direction of the thermal barrier coating.

19. A thermal barrier coating for a substrate, the thermal barrier coating comprising:
 a ceramic material consisting of zircon;
 a metal silicate selected from the group consisting of $YSiO_3$, $YbSiO_3$, and $ScSiO_3$, and combinations thereof, a metal disilicate, or combinations thereof;
 a plurality of pores, and
 wherein the substrate comprises a silicon-based substrate and the thermal barrier coating forms a portion of a protective coating for the silicon-based substrate, the protective coating further comprising a braze layer directly on the silicon-based substrate, an environmental barrier coating disposed between the braze layer and the thermal barrier coating, and a transition layer disposed between the environmental barrier coating and the thermal barrier coating.

* * * * *